(12) United States Patent
Ronin

(10) Patent No.: US 7,240,867 B2
(45) Date of Patent: Jul. 10, 2007

(54) PROCESSING SYSTEM FOR MANUFACTURING COMPOSITE CEMENTITIOUS MATERIALS WITH REDUCED CARBON DIOXIDE EMISSIONS

(75) Inventor: Vladimir Ronin, Luleå (SE)

(73) Assignee: Procedo Enterprises Etablissement, Vaduz (LI)

( * ) Notice: Subject to any disclaimer, the term of this patent is extended or adjusted under 35 U.S.C. 154(b) by 583 days.

(21) Appl. No.: 10/862,784

(22) Filed: Jun. 7, 2004

(65) Prior Publication Data

US 2005/0252421 A1   Nov. 17, 2005

(30) Foreign Application Priority Data

May 13, 2004   (SE) .................................... 0401238

(51) Int. Cl.
*B02C 23/08* (2006.01)
*B02C 9/04* (2006.01)
*B02B 5/02* (2006.01)

(52) U.S. Cl. .................... 241/79.1; 241/80; 241/152.1; 241/101.8

(58) Field of Classification Search .................. 241/65, 241/79.1, 80, 97, 165.5, 152.1, 152.2, 101.8, 241/101.6, 151
See application file for complete search history.

(56) References Cited

U.S. PATENT DOCUMENTS

| 4,783,012 A | * | 11/1988 | Blasczyk et al. | .......... 241/24.1 |
| 5,110,056 A | * | 5/1992 | Blasczyk et al. | ............. 241/19 |
| 5,804,175 A | | 9/1998 | Ronin et al. | ................ 106/757 |
| 6,241,816 B1 | | 6/2001 | Ronin | ........................ 106/735 |
| 6,575,390 B2 | * | 6/2003 | Kamikawa et al. | ........... 241/43 |
| 6,630,022 B2 | | 10/2003 | Lessard et al. | ............. 106/817 |

FOREIGN PATENT DOCUMENTS

WO   WO 2004/041746 A1   5/2001

* cited by examiner

*Primary Examiner*—Faye Francis
(74) *Attorney, Agent, or Firm*—Alfred J. Mangels

(57) ABSTRACT

A processing arrangement for manufacturing composite cementitious materials, such as hydraulic blended cements, with significantly reduced Portland clinker minerals content. The arrangement includes a milling unit for pregrinding supplementary cementitious materials and highly reactive pozzolans or mineral fillers, such as fly ash, blast furnace slag, fine quartz, granitic quarry fines, and the like, and a milling unit for pregrinding the Portland cement. The pregrinding units are followed by grinding unit for grinding the preground components. The pregrinding units are adapted to work as an open circuit or as a closed circuit for the material being ground.

9 Claims, 1 Drawing Sheet

PROCESSING SYSTEM FOR MANUFACTURING COMPOSITE CEMENTITIOUS MATERIALS WITH REDUCED CARBON DIOXIDE EMISSIONS

BACKGROUND OF THE INVENTION

1. Field of the Invention

The present invention relates to a processing system for manufacturing composite cementitious materials as hydraulic blended cements with significantly reduced Portland clinker minerals content. The materials include an increased quantity of supplementary cementitious materials, such as, for example, fly ash, blast furnace slag, fine quartz, granitic quarry fines, and the like, along with highly reactive pozzolans or mineral fillers, such as, for example, fly ash, blast furnace slag, fine quartz, granitic quarry fines, and the like, for direct replacement of a part of the Portland cement in concrete mixtures. Such mixtures are therefore characterized by a significantly improved environmental profile.

2. Description of the Related Art

It is well known that each ton of production of standard Portland cement is accompanied by the release of about one ton of carbon dioxide. About half of that quantity comes from the decarbonation of limestone within the kiln and the other half from energy consumption, primarily within the kiln.

It follows that the only way in which the cement industry can achieve meaningful reductions in carbon dioxide emissions is by reduction of Portland clinker production and an increased use of fillers.

Traditional plants for the production of blended cement include the intergrinding of Portland cement clinker with different types of microfillers, for example, blast furnace slag, fly ash, limestone, and the like, mainly in rotating ball mills. Such methods do not provide more than about 20 to 25% of Portland clinker replacement by fly ash, and approximately 30 to 50% by blast furnace slag, without a significant negative influence on the cement performance, such as a sharp increase of setting time, a very low strength development during the curing period of from 0 to 28 days, and the like. It takes up to 3 times longer, such as 2 to 3 months, to achieve the 28-day strength of traditional Portland cement concretes. At the same time, high volume fly ash (HVFA) cements do have significant benefits in comparison with traditional Portland cements.

The introduction of fly ash or other types of fillers, for example fines from granitic quarries or quartz sand fines, for replacement of Portland cement directly in the concrete mixer in amounts more that 15 to 20% is not efficient, and it could negatively influence the performance of the concrete (reduced strength, etc).

Existing methods of grinding and mechanical activation of such fillers could give some improvement, as described in U.S. Pat. No. 6,630,022, but it appears to be economically ineffective, and it allows replacement of only 20% of Portland cement without experiencing a reduction of the concrete compressive strength.

In International Patent Application No. PCT/SE03/001009 (Publication No. WO 2004/041746 A1) there is described a process for producing a blended cement. The blended cement contains Portland cement that is mixed thoroughly with a microfiller, and possibly a water reducing agent, to a dry cement mixture, along with fine supplementary cementitious materials selected from the materials blast furnace slag, fly ash, quartz, silica, and amorphous silicon dioxide. According to the disclosure in that application, supplementary materials are subjected to a grinding step in a dry state, and the supplementary ground materials are then subjected to grinding together with at least 20% by weight of the total grinding mass of a highly reactive cement mixture in a dry state. A polymer in the form of a powdery water-reducing agent is also added.

A problem in producing such a cement mixture is that in order to obtain the desired result the fineness of the components must be strictly controlled. This is especially true for a plant where the cement mixture is produced in a continuous way.

The present invention is directed to such a continuous production plant.

SUMMARY OF THE INVENTION

The present invention thus relates to a processing arrangement for manufacturing composite cementitious materials such as hydraulic blended cements with significantly reduced Portland clinker minerals content. The cementitious materials include an increased amount of supplementary cementitious materials, such as, for example, fly ash, blast furnace slag, fine quartz, granitic quarry fines, and the like, along with highly reactive pozzolans or mineral fillers, such as, for example, fly ash, blast furnace slag, fine quartz, granitic quarry fines, and the like, for direct replacement of Portland cement in concrete. The arrangement includes a silo for Portland cement, a silo for fly ash or other types of supplementary materials, and a silo for cement kiln dust or other types of setting-time-regulating agents, and a storage unit for polymer additives. The arrangement also includes proportioning means, mixing means, grinding devices, and discharge means. A milling unit is provided for pregrinding the supplementary materials and milling unit is provided for pregrinding the Portland cement. The pregrinding unit is followed by a grinding unit for grinding the preground components. The pregrinding unit is adapted to work in an open circuit or in a closed circuit for the material being ground.

BRIEF DESCRIPTION OF THE DRAWING

The structure, operation, and advantages of the present invention will become further apparent upon consideration of the following description, taken in conjunction with the accompanying drawing in which.

DESCRIPTION OF THE PREFERRED EMBODIMENTS

Figure 1:
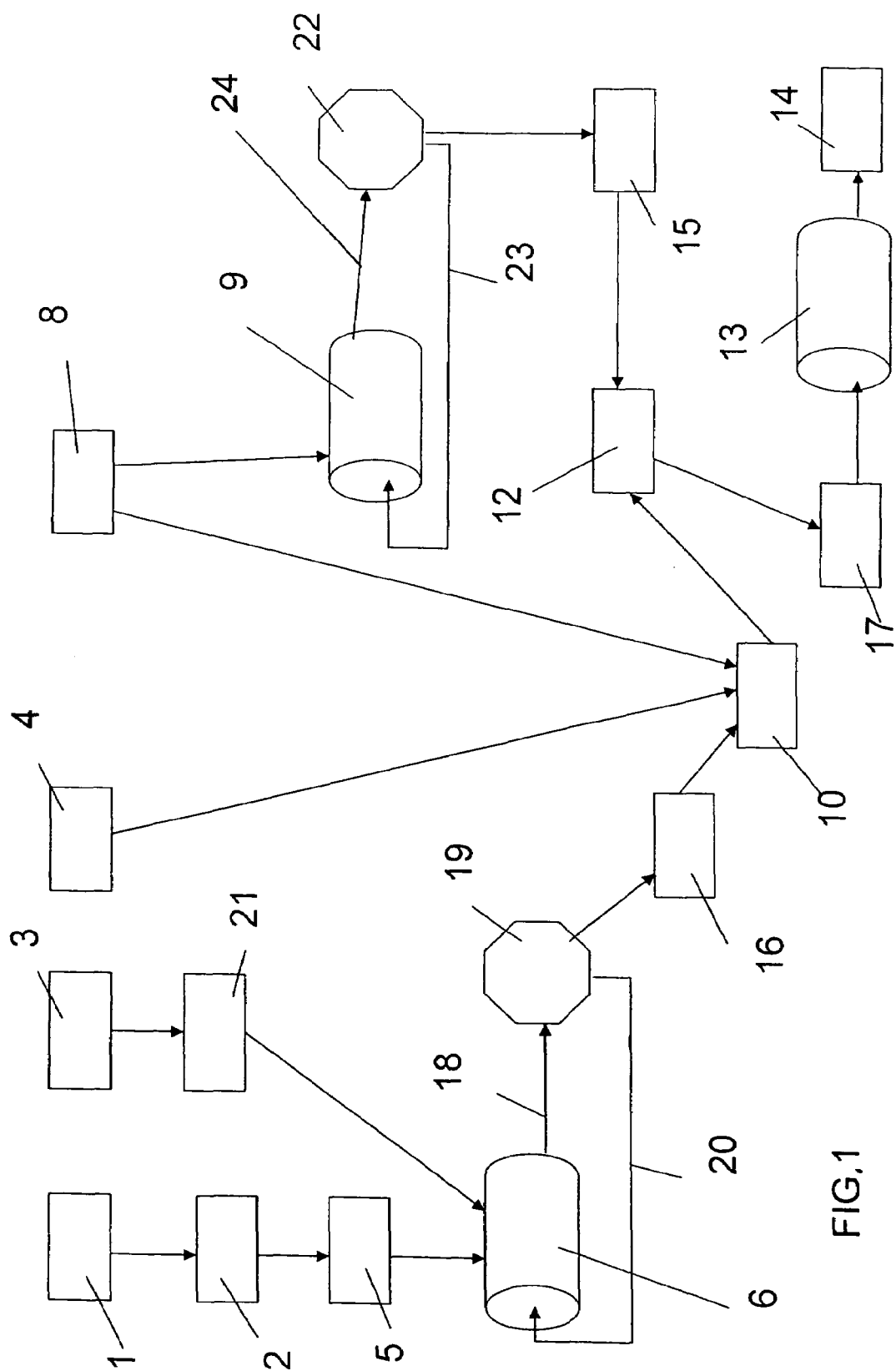
FIG. 1 is a flow chart showing an equipment arrangement and an operating sequence for a processing system in accordance with the present invention.

In FIG. 1 the following reference numerals indicate the following apparatus: 1 denotes a feed station for a drying unit, 2 denotes a drying unit (a rotary dryer or a fluid bed dryer), 3 denotes a silo for slag and/or fly ash, 4 denotes a silo for additives, 5 denotes a intermediate silo for dried sand, 6 denotes a milling unit for pregrinding of quartz sand, 19 denotes an air classifier with cyclone and dust collector, 8 denotes a silo for Portland cement, 9 denotes a milling unit for pre-grinding of a part of the Portland cement before mixing with other components before processing, 10 denotes an intermediate silo for an unground portion of the Portland cement and preground sand, slag, and additives, 22 denotes an air classifier with cyclone and dust collector, 12 denotes a rotary mixer, 13 denotes vibrating mills for processing of raw material feed (installed in parallel or in series), 14 denotes a silo for the final blended cement product, 15 denotes an intermediate silo for the preground portion of cement, 16 denotes a silo for preground quartz, and 17 denotes a silo for the mixture of materials prior to a final milling step.

According to a preferred embodiment there is provided a unit 21 for carbon removal from fly ash, which unit is adapted to lower the carbon content in the fly ash to below about 4% by weight. The unit can operate according to any suitable known technique for carbon removal.

As is apparent from the international application referred to above, the quartz in the above example can be any suitable supplementary quartz material.

According to the above, sand, slag, additives in the form of, for example, a water reducing agent, and Portland cement are fed into the present arrangement.

Regarding the quartz, or sand, the sand is first fed from feeding station 1 to drying unit 2, where it is dried. Thereafter it is fed to intermediate silo 5. Slag, or any other suitable additive, is fed from a silo 3 to a conduit merging with a conduit from silo 5 for sand. The mixture of sand and slag is fed to milling unit 6. After the sand and slag have been preground, they are fed to silo 16 and then to silo 10.

Regarding the Portland cement, the cement is fed from silo 8 to silo 10. Additives like water reducing agents are also fed to silo 10, as well as sand and slag that have been preground in milling unit 6. Portland cement is also fed from silo 8 to milling unit 9. From milling unit 9 the cement is fed to silo 15 for preground cement. The materials in silos 10 and 15 are then fed to a rotary mixer 12 and thereafter to silo 17.

From silo 17 the mixture of materials is fed to final milling unit 13. After being milled in milling unit 13 the final material is fed to silo 14.

According to the invention, the arrangement thus includes milling unit 6 for pregrinding the supplementary materials and milling unit 9 for pregrinding the Portland cement, which pregrinding unit is followed by grinding unit 13 for grinding of the preground components.

According to a very important feature of the present invention, the pregrinding milling units 6, 9 are adapted to work as an open circuit or a closed circuit for the material being ground. The closed circuit associated with milling unit 6 includes a conduit 18 from the milling unit to air classifier 19, which is able to sort out and convey large fractions of the material being ground back to mill 6 through a conduit 20.

The closed circuit associated with milling unit 9 includes, in a corresponding way, a conduit 24 from the milling unit to air classifier 22, which is able to sort out and convey large fractions of the material being ground back to mill 9 through a conduit 23.

To both milling units 6, 9 there are connected a cyclone and a dust collector. The material collected there is fed to a respective downstream silo in the main flow.

According to a preferred embodiment of the invention, milling unit 6 for the supplementary material is arranged to pregrind the supplementary material to a fineness of an average particle size of from about 100 to about 300 microns.

According to another preferred embodiment of the invention, milling unit 9 for the Portland cement is arranged to pregrind the Portland cement to a fineness of an average particle size of from about 10 to about 30 microns.

Since only material fractions that are too large will be sorted out in the air classifiers, the circuits will be open when there are no such materials leaving the respective milling units 6, 9.

According to still another preferred embodiment, the arrangement includes a unit 2 for drying the supplementary material and fillers to a moisture content of less than about 0.2% by weight, which unit is located upstream of the milling unit.

Thus, the present invention provides a production plant, or arrangement, in which production of the cement material mentioned in the introductory part of the application can be performed in a continuous way.

Although particular embodiments of the present invention have been illustrated and described, it will be apparent to those skilled in the art that changes and modifications can be made without departing from the spirit of the present invention. Accordingly, it is intended to encompass within the appended claims all such changes and modifications that fall with the scope of the present invention.

What is claimed is:

1. A processing arrangement for manufacturing composite cementitious materials with significantly reduced clinker minerals content and containing an increased quantity of supplementary cementitious materials and highly reactive pozzolans or mineral fillers for direct replacement of cement in concrete, said arrangement comprising: storage means for separately storing cement, additives, and supplementary cementitious materials, a first milling unit downstream of the storage means for pregrinding the supplementary materials, a second milling unit downstream of the storage means for pregrinding the cement, and a grinding unit downstream of each of the first and second milling units for grinding the preground components.

2. A processing arrangement according to claim 1, including an air classifier downstream of at least one of the milling units for sorting large fractions of material being ground.

3. A processing arrangement according to claim 1, wherein the first milling unit for pregrinding the supplementary material pregrinds the supplementary material to a fineness having an average particle size of from about 100 to about 300 microns.

4. A processing arrangement according to claim 1, wherein the second milling unit for pregrinding the cement pregrinds the cement to a fineness having an average particle size of from about 10 to about 30 microns.

5. A processing arrangement according to claim 1, including a drying unit upstream of the first milling unit for drying the supplementary material and fillers to a moisture content of less than about 0.2% by weight.

6. A processing arrangement according to claim 1, including means for carbon removal from fly ash to lower the carbon content in the fly ash to below about 4% by weight.

7. A processing arrangement according to claim 2, including a recirculation conduit extending between the at least one air classifier and an associated milling unit for conveying large size particles from the at least one air classifier to the associated milling unit.

8. A processing arrangement according to claim 1, wherein the supplementary cementitious materials are selected from the group consisting of fly ash, blast furnace slag, fine quartz, granitic quarry fines, and combinations and mixtures thereof.

9. A processing arrangement according to claim 1, wherein the pozzolans or mineral fillers are selected from the group consisting of as fly ash, blast furnace slag, fine quartz, granitic quarry fines, and combinations and mixtures thereof.

* * * * *